April 28, 1970 NOBUTOSHI KIHARA 3,509,273

RECORDING OF TELEVISION SIGNALS

Filed July 18, 1966

INVENTOR.
NOBUTOSHI KIHARA
BY
Ward, Haselton, McElhannon, Orme, Brooks & Fitzpatrick
ATTORNEYS United States Patent Office 3,509,273
Patented Apr. 28, 1970

3,509,273
RECORDING OF TELEVISION SIGNALS
Nobutoshi Kihara, Tokyo, Japan, assignor to Sony Corporation, Tokyo, Japan, a corporation of Japan
Filed July 18, 1966, Ser. No. 569,789
Claims priority, application Japan, July 16, 1965, 40/42,981
Int. Cl. H04n 5/22, 5/78
U.S. Cl. 178—6.6 3 Claims

ABSTRACT OF THE DISCLOSURE

In recording selected segments of continuously occurring television signals which have horizontal and vertical synchronizing pulses interspersed therealong, a recording medium and recording head are moved cyclically relative to each other by an adjustable drive, the horizontal and vertical synchronizing pulses are separated from the television signals, the adjustable drive is controlled in accordance with phase comparison of signals representative of the speed of relative movement of the recording medium and head with signals having a fixed time relation to the horizontal synchronizing pulses so as to achieve a cycle of the relative movement precisely in the time period of each of the segments of television signal to be recorded, and the supplying of the television signals to the recording head is gated in response to successive vertical synchronizing pulses so as to supply to the head only a selected segment of the television signals in the period for a cycle of the relative movement of the recording medium and head.

Figure 1:
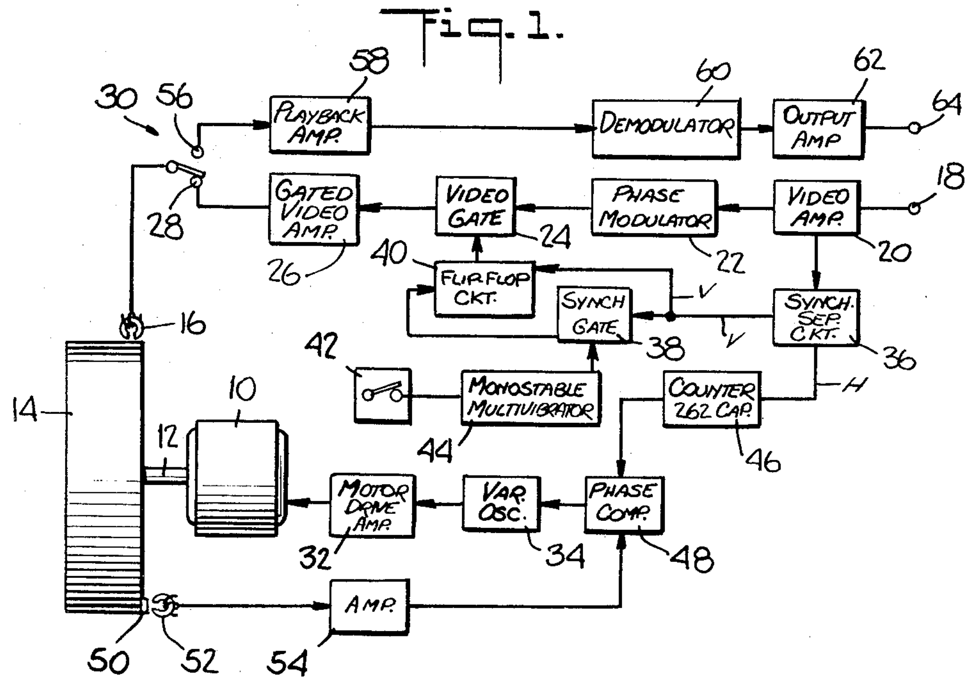

This invention relates to recording systems and more particularly it concerns the recording of selected television type signals.

The present invention is particularly useful in connection with the recording of a single frame or field of television signals and the continuous playback of the selected frame. Such technique is sometimes referred to as "stop action"; and it permits the isolation and "freezing" of any desired portion of an action sequence.

The invention is also useful in connection with the recording of a sequence of frames to provide a short action presentation which is continually played over and over. Such presentations may be utilized in connection with advertising or in other special effects situations.

The recording of a single frame or of a short sequence of frames may be accomplished by means of the present invention without the complex and expensive equipment usually associated with television recording systems. Thus for the certain special purposes in which a single frame or a short sequence action is desired, costs may be kept at a far lower level than heretofore has been possible.

In the present invention a recording is made by moving a recording head over a recording medium (or vice versa) during the television broadcast. The head is made to traverse a given path, the duration of the traversal being equal to the duration of the original broadcast of the frame or sequence. Then, when a playback head is continuously and repetitively traced over the path, the frame or sequence is continuously presented. In a specific application to be described, the recording is made about the circumference of a magnetic drum by causing the drum to rotate over a fixed magnetic recording head.

A problem of synchronization arises in connection with the recording of television signals for continuous reproduction. This is because the phase of the horizontal synchronizing signal tends to disagree with that of the video signals being recorded. For example, when one video signal field is recorded by means of a fixed magnetic recording head which traces a circumferential track on the surface of a magnetic drum rotating at 60 revolutions per second, a disagreement between the phase of the horizontal synchronizing signals and of the video signals will occur. This can be seen from the fact that the number of horizontal synchronizing pulses present in one standard field without interlacing is 262.5. When such a magnetic track is replayed successively a number of times, the horizontal synchronizing pulse intervals will differ at the track joint. Accordingly, the reproducing picture will be distorted.

The present invention overcomes the above described synchronization problem and makes it possible to maintain the horizontal synchronizing pulse with the joint of a magnetic recording track or path. Moreover the present invention accomplishes this with inexpensive and compact equipment which is simple and convenient to operate.

According to one aspect of the invention, signals are developed which are representative of the speed of movement of the recording medium and these signals are time or phase compared with the horizontal synchronization pulses of the video signals being recorded. The difference signals are then used to adjust the speed of the recording medium. In another of its aspects the present invention provides a novel signal gating system which ensures that a recording will begin at the initiation of a signal field or frame and will terminate at the completion of the frame.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Figure 2:
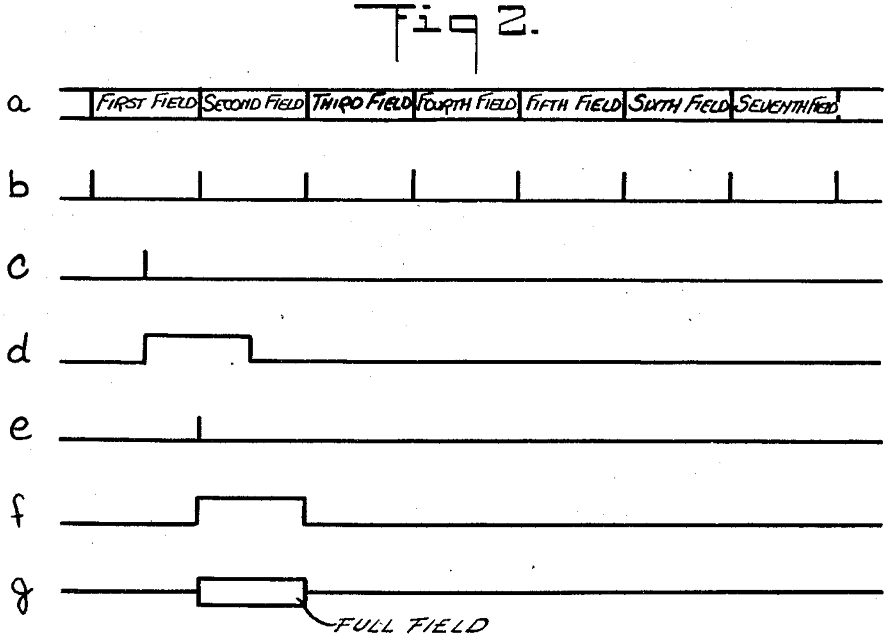

A specific embodiment of the invention has been chosen for purposes of illustration and description, and is shown in the accompanying drawings, forming a part of the specification, wherein:

FIG. 1 is a block diagram illustrating one example of a magnetic recording system according to the present invention; and FIG. 2 (*a* through *g*) is a series of waveforms which illustrates the time relationship of various video signals in selected portions of this system of FIG. 1.

In the system of FIG. 1 there is provided a drum drive motor 10 which is connected through an output shaft 12 to turn a rotary magnetic drum 14. A magnetic recording and reproducing head 16 is disposed in close positional relationship to the drum 14 to effectively trace a circumferential path about the surface of the drum as the drum rotates. Signals are supplied to the system from a video signal source (not shown) via an input terminal 18. These signals are amplified in a first video amplifier 20 and are thereafter passed through a phase modulator circuit 22. The output of the phase modulator circuit 22 is supplied via a video gate circuit 24 and a gated video amplifier 26 to a receive contact 28 on a double-throw record playback switch 30. The contact arm of the switch 30 is connected to the recording and reproducing head 16.

The drum drive motor 10 receives speed control signals from a motor drive amplifier 32 which in turn receives variable frequency signals from a variable oscillator 34. The output of the variable oscillator 34 is normally at a frequency approximately 60 cycles per second; but this may be adjusted to a certain degree as will be explained hereinafter.

A synchronizing signal separating circuit 36 is provided to receive output signals from the first video amplifier 20 and to isolate from those signals their accompanying horizontal and vertical synchronizing pulses. The vertical synchronizing pulses (V) are supplied simultaneously to a synchronizing gate circuit 38, and to the reset terminal of a flip-flop circuit 40. The output from the synchronizing gate 38 is supplied to the set terminal of the flip-flop circuit 40. The output from the flip-flop circuit 40 is used to control the video gate circuit 24. A trigger signal source 42, shown schematically as a normally opened switch, is provided to supply a signal impulse at a desired time to initiate the recording operation. The signal from the trigger signal source 42 is supplied to a mono-stable multi-vibrator 44 whose output in turn is supplied to control the operation of the synchronizing gate 38.

The manner in which the above described portion of the system operates to isolate an integral scan of video signals will be described in conjunction with the wave forms of FIG. 2. During operation of the system, input signals are supplied to the input terminal 18 from an external video source. This source may be a television receiving system, a television recording system or the monitoring system of a television broadcast studio. These signals which appear at the input terminal 18 are represented by the wave form FIG. 2*a*. As can be seen the input video signals consist of a continuous train of fields identified respectively as the first, second, third, etc. In this case each field is initiated by a vertical synchronizing pulse as shown in FIG. 2*b*. These vertical synchronizing pulses (V) are isolated in the synchronizing signal separating circuit 36 and are supplied simultaneously to the synchronizing gate 38 and to the reset terminal of the flip-flop circuit 40. The synchronizing gate 38 is normally in a closed condition so that no signals pass through to the reset terminal of the flip-flop circuit 40. Further, since the flip-flop circuit 40 is normally in its reset condition, the signals passing through to its reset terminal have no effect upon it. In its reset condition, the flip-flop circuit 40 produces no output signal and thus leaves the video gate circuit 24 in closed condition so that no video signals can pass through to the magnetic recording and reproducing head 16.

Now when it is desired to record one of the fields of video signals, the trigger signal source 42 is actuated as by closing a push button switch thereon. This produces a signal (FIG. 2*c*) which is supplied to actuate the mono-stable multivibrator 44. When the mono-stable multivibrator 44 is thus actuated, it produces a positive output signal for a duration approximately equivalent to that of a single field of video signals. This positive output signal is applied to the synchronizing gate 38; and the gate in turn is opened for a length of time corresponding to approximately the duration of one field of video signals (FIG. 2*d*). As a result, the next subsequent vertical synchronizing pulse (FIG. 2*e*) will pass through the synchronizing gate 38 and will set the flip-flop circuit 40. The flip-flop circuit then supplies a signal to open the video gate circuit 24. The video signals from the input terminal 18 may then pass through to be recorded on the drum 14. The video gate circuit 24 remains open until the flip-flop circuit 40 is reset by the application of the next subsequent vertical synchronizing pulse to its reset terminal. This, of course, causes the video gate circuit 24 to close and stop the further flow of video signals to the head 16 for recordation on the drum 14.

The video gate circuit opening signals from the flip-flop circuit 40 are shown in FIG. 2*f*. It will be noted that these signals coincide precisely with the occurrence of a full field or frame of video scan signals, i.e., the signals which occur between two successive vertical synchronizing pulses. The resulting video signals which appear on the rotary magnetic drum are shown in FIG. 2*g*.

The synchronizing signal separating circuit 36 in addition to isolating the vertical synchronizing pulses (V), also isolates the horizontal synchronizing pulses. These horizontal synchronizing pulses are supplied from the circuit 36 to a counter 46. This counter has a capacity of 262 which is very close to the total number of horizontal seams in a standard field or frame of television signals without interlacing. Thus the counter circuit 46 produces one output pulse after the occurrence of every 262 horizontal synchronizing pulses, or about one output pulse for each field or frame. The output pulses from the counter circuit 46 are supplied to one input of a phase comparator circuit 48. The other input to the phase comparator circuit 48 comprises signals which represent the rotational speed of the rotary magnetic drum 14. These signals are derived by means of a small piece of magnetic material 50 mounted on the drum 14. A magnetic pick-up head 52 is fixedly stationed at a location such that the magnetic material 50 passes in close proximity to the pick up head 52 once during each complete rotation of the drum 14. As a result of the movement of the magnetic material past the pick up head 52, a pulse signal is generated. This signal is supplied through a pulse signal amplifier 54 to the other input of the phase comparator 48. The pulses (H) from the counter circuit 46 and from the pick up head 52 are phased compared in the circuit 48 and the resulting error signal is applied to the variable oscillator 34 to change its output frequency, thereby changing the rotational speed of the motor 10 and of the rotary magnetic drum 14.

As a result of the above, the magnetic drum 14 is rotated in synchronism with the cyclic period of the pulses from the counter circuit 48. Consequently the video signal of one individual field is selectively obtained via the video gate circuit 24 and is recorded on the drum 14 in the form of a circumferential magnetic track within a period of time corresponding to the cyclic period of one scan. Furthermore, it will be noted, the horizontal synchronizing pulses exactly agree with the joint of the magnetic recording track.

During reproduction of the signals from the drum 14, the switch 30 is actuated to connect the head 16 to a playback terminal 56. Then as the drum 14 continues to rotate under the record and reproducing head 16, the signals generated by the head 16 are transmitted via the switch 30, and through a playback amplifier 58, a demodulator 60, and an output amplifier 62 to an output terminal 64. The output terminal 64 may, of course, be connected to any signal transmitting and/or transducing devices such as a television video tube or monitor.

It will be appreciated that with the above described arrangement, it is possible to avoid the staggering of the reproduced picture which would otherwise be caused by variations in the arrangement of the horizontal synchronizing signals.

It will be noted that in the foregoing description the speed of the rotary magnetic drum is controlled by each two hundred and sixty second horizontal synchronizing pulse. It will be apparent however that the drum need not always be controlled by this number of pulses; and in fact, a magnetic drum need not necessarily be employed. For example, a magnetic sheet such as a disk may be used in place of the drum. Additionally, while the illustrative embodiment has been described with reference to the situation where the video signals are recorded on a moving magnetic track by means of a fixed magnetic head, it is to be understood that the invention is equally applicable to recording by means of a moving magnetic head. In such case the head would move in a generally axial direction while the drum rotated. Such movement may be continuous so as to generate a helical track, or it may be intermittent so as to generate a series of joined axially displaced circumferential tracks along the drum. In each of these cases, the axial movement of the head would be selected to be less than the actual width of the head.

Having thus described the invention with particular reference to the preferred form thereof, it will be obvious to those skilled in the art to which the invention pertains after understanding the invention, that various changes and modifications may be made therein without departing from the spirit and scope of the invention, as defined by the claims appended thereto.

What is claimed as new and desired to be secured by Letters Patent is:

1. Apparatus for recording selected segments from continuously occurring television signals which have horizontal and vertical synchronizing pulses interspersed therealong, said apparatus comprising a record medium and a recording head which are mounted for cyclical relative movement, adjustable drive means for effecting said cyclical relative movement, means for separating said horizontal and vertical synchronizing signals from the television signals, means for producing signals representative of the speed of said relative movement, phase comparing means comparing said signals representative of the speed with selected ones of said horizontal synchronizing pulses, control means operable by the output of said phase comparing means to control said adjustable drive means so that the period of said cyclical relative movement is maintained precisely as a selected multiple of the period of said horizontal synchronizing pulses, signal transmission means having gate circuit means interposed therein to apply the television signals to said head only when said gate circuit means is open, and gate operating means actuable to supply gate opening and gate closing signals respectively to said gate circuit means in response to the occurrence of selected successive vertical synchronizing pulses, whereby to record, in said period of the cyclical relative movement, the segment of said telesion signals between said selected successive vertical synchronizing pulses.

2. Apparatus according to claim 1, in which said adjustable drive means includes a variable speed electrical motor, and said control means includes a variable frequency oscillator having the frequency of its output controlled by said output from the phase comparing means and means to adjust the speed of said motor in correspondence with said output frequency of said oscillator.

3. Apparatus according to claim 1, in which said gate operating means includes a flip-flop circuit having a normal reset condition and a set condition to respectively provide said gate closing and opening signals to said gate circuit means, means to supply said vertical synchronizing pulses to set and reset terminals of said flip-flop circuit and having a normally closed synchronizing gate circuit interposed in the connection to said set terminal, monostable multivibrator means having an unstable period substantially equal to the period between successive vertical synchronizing pulses, means for connecting the unstable output of said multivibrator means to said synchronizing gate circuit for opening the latter, and means for triggering said monostable multivibrator means.

References Cited

UNITED STATES PATENTS

| | | | |
|---|---|---|---|
| 2,955,157 | 10/1960 | Young. | |
| 3,017,462 | 1/1962 | Clark. | |
| 3,400,317 | 9/1968 | Thomas | 318—314 |
| 3,290,449 | 12/1966 | Morita. | |
| 3,397,283 | 8/1968 | Stosberg. | |

ROBERT L. GRIFFIN, Primary Examiner

H. W. BRITTON, Assistant Examiner

U.S. Cl. X.R.

178—69.5